United States Patent [19]
Hirano et al.

[11] Patent Number: 5,598,043
[45] Date of Patent: Jan. 28, 1997

[54] DUST-PROOF STRUCTURE FOR A LINEAR MOTION ACTUATOR

[75] Inventors: Takashi Hirano; Sousuke Kawashima, both of Gunma, Japan

[73] Assignee: NSK Ltd., Tokyo, Japan

[21] Appl. No.: 227,032

[22] Filed: Apr. 13, 1994

[30] Foreign Application Priority Data

Apr. 13, 1993 [JP] Japan .................. 5-018702 U

[51] Int. Cl.⁶ ............................................ H02K 5/10
[52] U.S. Cl. ........................ 310/12; 310/88; 74/566
[58] Field of Search ........................ 310/12, 13, 14, 310/88; 318/135; 74/17.8, 18, 18.1, 18.2, 473 R, 566

[56] References Cited

U.S. PATENT DOCUMENTS 4,545,290  10/1985  Lieberman ........................ 92/88
4,552,031  11/1985  Barbagli ........................ 74/473 R

FOREIGN PATENT DOCUMENTS

2-127820  10/1990  Japan .
4-60642   5/1992   Japan .
5-29829   7/1993   Japan .

*Primary Examiner*—Steven L. Stephan
*Assistant Examiner*—Judson H. Jones
*Attorney, Agent, or Firm*—Sughrue, Mion, Zinn, Macpeak & Seas

[57] ABSTRACT

A linear motion actuator of the present invention is provided with a casing including slits extending axially, a carriage being axially movable along guide rails within the casing, the carriage including driven member mounting portions protruded outside through the slits for mounting a driven member, a plurality of seal bands fastened to the driven member mounting portions of the carriage for sealing openings of the slits regardless of the location of the carriage when the seal bands are moved along the slits, and a driving device for driving the carriage to move along the guide rails. The linear motion actuator with a dust-proof function has no need of passing the seal bands through the carriage, so that the carriage have a solid and simple structure of high rigidity without the abnormal shifting motion of the seal bands.

12 Claims, 5 Drawing Sheets

FIG. 9
PRIOR ART

DUST-PROOF STRUCTURE FOR A LINEAR MOTION ACTUATOR

BACKGROUND OF THE INVENTION

The present invention relates to improvements over the dust-proof structure for a linear motion actuator with a carriage which is provided in a casing, and is linearly moved in an axial direction.

Figure 6:
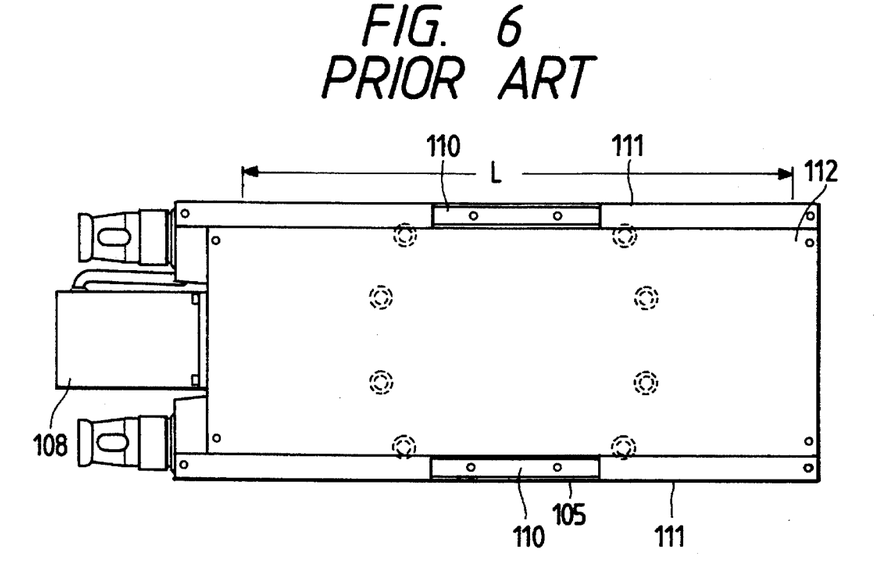
FIG. 6 is a plan view showing a conventional linear motion actuator.
Figure 7:
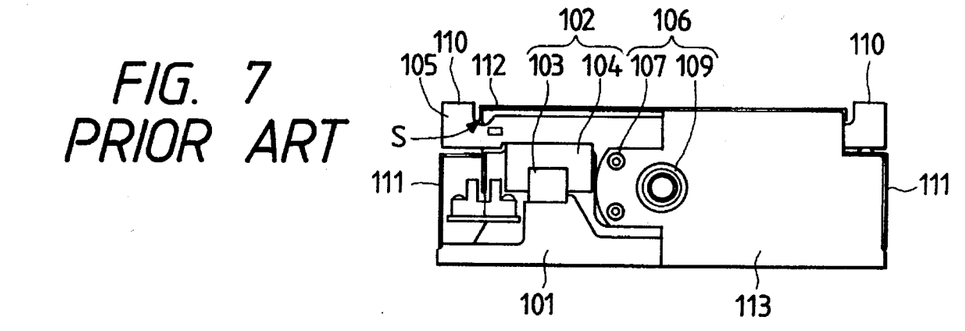
FIG. 7 is a front view, partially broken away to illustrate the interior structure, showing the linear motion actuator of FIG. 6.

In general, a linear motion actuator is provided with a type as shown in FIGS. 6 and 7. A pair of parallel linear guides are disposed on an elongated base 101. A carriage 105 is fastened to a slider 104, which linearly moves along the guide rail 103. The carriage 105 is coupled with a ball nut 107 of a ball-and-screw mechanism 106 as a rotation-linear converting mechanism. An AC servo motor 108 drives a ball-screw shaft 109 to rotate. With rotation of the ball-screw shaft, the carriage 105 is linearly moved along the guide rail 103 in the axial direction. A workpiece W is fastened onto the driven member mounting portion 110 located on both sides of the carriage 105, by means of screws. The accurate linear motion and the accurate positioning of the work can be carried out repeatedly.

The actuator is covered with side covers 111, an upper cover 112, an end cover 113, and the like, for the purposes of improving appearance and protecting the inner accurate parts, such as the linear guides 102 and the ball-and-screw mechanism 106, from incoming dust.

The driven member mounting portion 110 of the carriage 105 must be exposed to, so slits are formed between each side cover and the upper cover 112. The slits axially extend over the entire range of the movement of the carriage 105. The slits S allows dust to enter the inside of the casing. In this respect, the dust-proof measure is imperfect.

Figure 8:
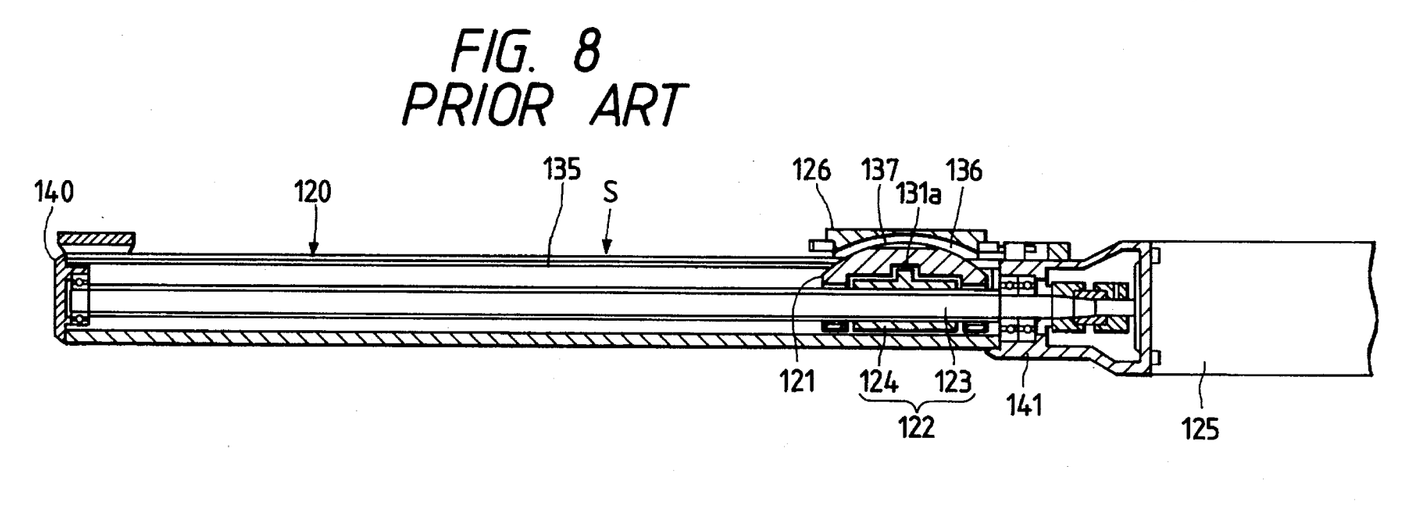
FIG. 8 is a longitudinal sectional view showing a dust proof structure of another conventional linear motion actuator.
Figure 9:
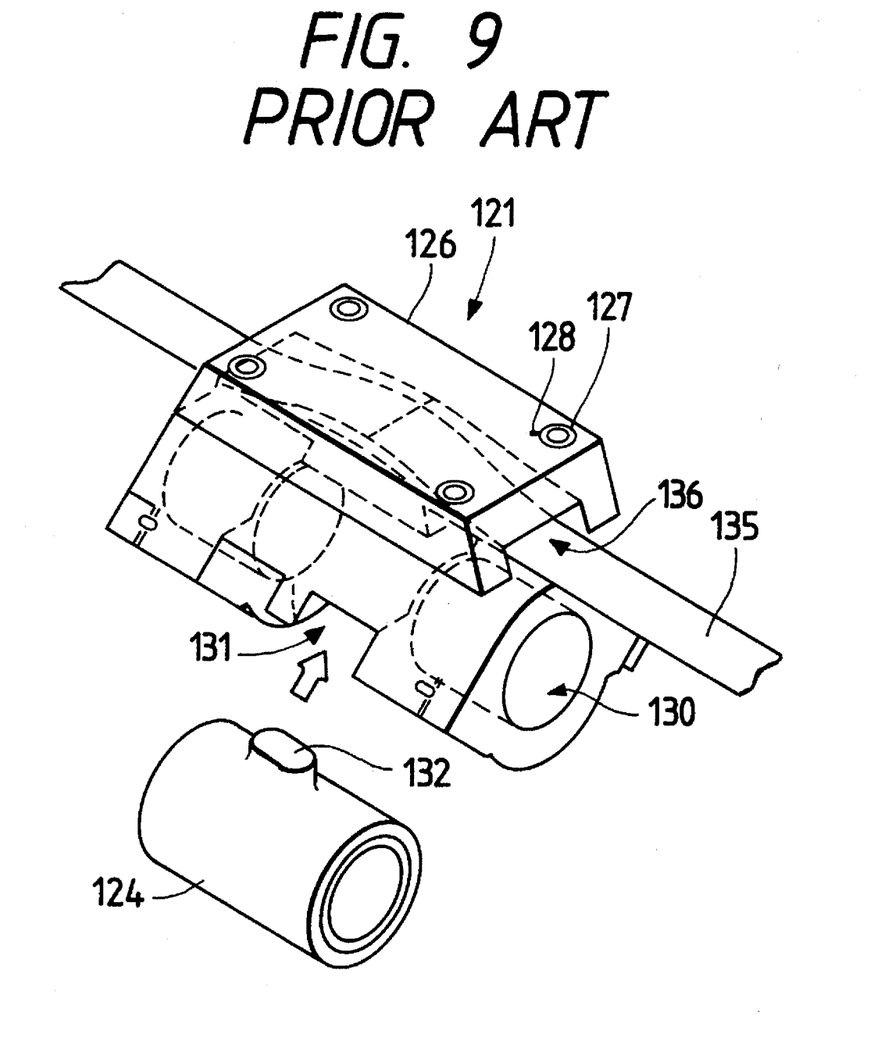
FIG. 9 is an enlarged perspective view showing a key portion of the dust proof structure of FIG. 8.

A linear motion actuator of the type in which the slits covering the carriage movement range are covered with a movable belt is disclosed in Unexamined Japanese Utility Model Publication No. Hei. 4-60642. As shown in FIGS. 8 and 9, a carriage 121 is axially slidable within a cylinder tube 120 with an axially elongated slit S formed in one side (upper surface) thereof. The carriage 121 is coupled with a ball nut 124 receiving a screw shaft 123 of the ball-and-screw mechanism 122, and is linearly moved in the axial direction by an AC servo motor 125.

A table body 126 is protrudes above the carriage 121, and is exposed over the cylinder tube 120 through the slit S. An upper surface of the table body 126 serves as a driven member mounting portion 128 with bolt holes 127 at the four corners.

A shaft receiving hole 130 through which the screw shaft 123 passes is formed in the carriage 121, as shown in FIG. 9. A nut receiving space 131 for receiving the ball nut 124 is formed in the middle of the shaft receiving hole 130. A square groove 131a is formed in the ceiling wall of those walls defining the nut receiving space 131. The bottom of the nut receiving space 131 is open. A ball nut 124 with a square stopper 132 is placed in the nut receiving space 131 in a state that the protrusion 132 is fit to the groove 131a.

The carriage 121 having two downward extending slopes is shaped like V in cross section. A slider member (not shown) is secured to the bottom edges of the slopes of the carriage 121. In this state, the carriage 121 is disposed within the cylinder tube 120 shaped like a diamond in cross section.

The table body 126 which protrudes over the carriage 121 has a band receiving hole 136 through which the seal band 135 passes. The band receiving hole 136 has a gently upward curved band guide face 137, and opens downward. The opening of the band receiving hole is longitudinally elongated in the lower side of the table body. The seal band 135 made of a thin steel band is inserted into the band receiving hole 136 from the opening.

After the carriage 121 is assembled into the cylinder tube 120, the slit S of the upper surface of the cylinder tube 120 is covered with the seal band 135. A strip like rubber magnet is attached to the edge of the slit S. The seal band 135 is magnetically attracted by the magnet rubber, thereby improving the sealing performance by the seal band. The ends of the seal band 135 are secured to the end cap 140 and the head cap 141. The mid portion of the seal band 135 is located on the curved band guide face 137 of the carriage 121.

The AC servo motor 125 is turned forwardly or reversely, so that the screw shaft 123 is driven. Then, the ball nut 124 is moved forward or backward. In turn, the carriage 121 is moved forward or backward while being guided by the cylinder tube 120. The workpiece mounted on the driven member mounting portion 128 of the table body 126 is axially moved and stopped at a desired position.

At this time, the seal band 135 prevents dust from entering through the slit S of the cylinder tube 120. The table body 126 moves forward while pushing upward with the curved surface of the band guide face 137.

The conventional dust proof structure of the type in which the slit S of the cylinder tube 120 is sealed with the seal band 135 has a high dust proofing capability, but has the following problems.

(1) Since the seal band 135 is passed within the carriage 121, the carriage structure is complicated, and it is impossible to increase the rigidity of the carriage 121.

(2) The band receiving hole 136 extends longitudinally to pass through the central portion of the table body 126 of the carriage 121. The bolt holes 127 cannot be located in the central part of the driven member mounting portion 128 which is advantageous in securing a high rigidity. Accordingly, the bolt holes 127 must be located at the four corners of the driven member mounting portion 128. This results in increasing the size of the carriage 121.

In the case of a large linear motion actuator which transports a heavy workpiece, a high rigidity is essential in order to move the work at a high speed and to position it accurately. The carriage of the linear motion actuator is a member which couples the linear guides with the workpiece. Therefore, the carriage is the most important component in determining the rigidity of the linear motion actuator. The structure which is not capable of increasing the rigidity is not suitable for a large actuator.

SUMMARY OF THE INVENTION

The present invention has been made in view of the above circumstances and has an object to provide a dust-proof structure for a linear motion actuator in which seal bands for sealing the slits allowing the carriage to axially move are mounted outside the carriage, and the seal bands and the carriage are axially movable in a cooperative manner, whereby the dust-proof structure is simplified.

To achieve the above object, there is provided a linear motion actuator having a casing, linear guides located within the casing, a carriage axially movable with the assistance of the linear guides within the casing, a driving device for axially moving the carriage through a ball-and-screw mechanism, and slits elongating in the direction of the movement of the carriage being formed in one of the sides of the casing, the carriage including driven member mounting portions protruding above the casing. In the linear motion actuator thus constructed, pulleys are disposed on both ends of the casing as axially viewed. Further, one end of the seal band is fastened to one end of the carriage, while the other end thereof is fastened to the other end of the carriage in such a way that it passes the pulleys, is turned back at one end of the casing, reaches the other end of the casing, passes the pulleys, and is turned back thereat, thereby forming a loop of the movable seal band. The slits are sealed with the looped seal band.

The casing body is formed by an extrusion mold. An axially extending through hole or groove is formed in the extrusion mold. The lower part of the looped seal band passes through the through hole or groove.

Grooves may be formed in the end faces of the portions of the casing. The grooves receive the side edge of the seal band, respectively.

A guide plate is mounted on the lower part of the looped seal band, which passes through the through hole or groove of the casing body.

The lower side of the cover covering the upper side of the casing includes a pair of L-shaped extensions. Sound absorbing material is placed within a space formed by the extensions.

Thus, in the dust-proof structure for a linear motion actuator, the pulleys are provided on both ends of the casing as axially viewed. The seal band is looped in a manner that the seal band is fastened at one end to one end of the carriage, and the other end is turned back. The looped seal band circulates, together with the carriage reciprocatively moving linearly in the axial direction, thereby sealing the slits therewith. Accordingly, there is no need of passing the seal band through the carriage. The carriage may have a solid and simple structure of high rigidity. The size reduction of the linear motion actuator is easy.

By passing the lower part of the looped seal band through the through hole or groove of the casing, the high rigidity and the light weight can both be realized. The hollowed structure is well utilized.

Where the grooves receiving the side edges of the seal band are formed in the end faces of the portions of the casing, which define each slit, the sealing by the seal band is enhanced, and the abnormal shifting motion of the seal band can be minimized. Further, the dust-proof and suppression of noise leakage characteristics are enchanced.

With use of the guide plate to the lower part of the looped seal band, a stable movement of the seal band is secured even if the seal band is long for a large linear motion actuator.

Where the lower side of the cover covering the upper side of the casing includes a pair of L-shaped extensions, and sound absorbing material is placed within a space formed by the extensions, the rigidity of the cover is increased and the noise proof performance is improved.

DETAILED DESCRIPTION OF THE PREFERRED EMBODIMENTS

A first embodiment of a linear motion actuator according to the present invention will be described with reference to FIGS. 1 through 4.

Figure 1:
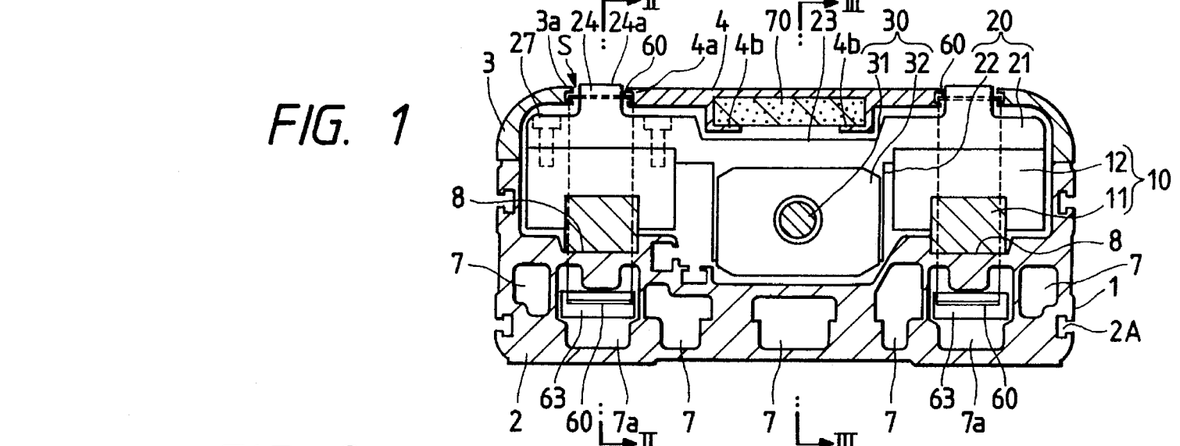
FIG. 1 is a cross sectional view showing a linear motion actuator according to an embodiment of the present invention.
Figure 2:
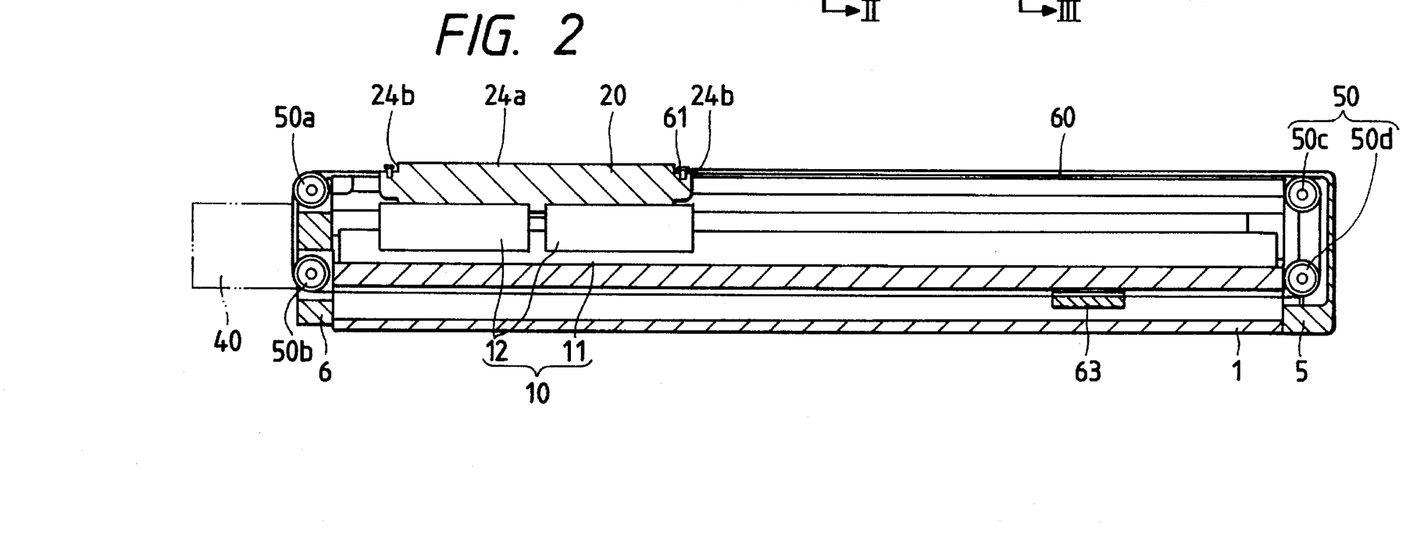
FIG. 2 is a longitudinal sectional view taken on line II—II in FIG. 1.
Figure 3:
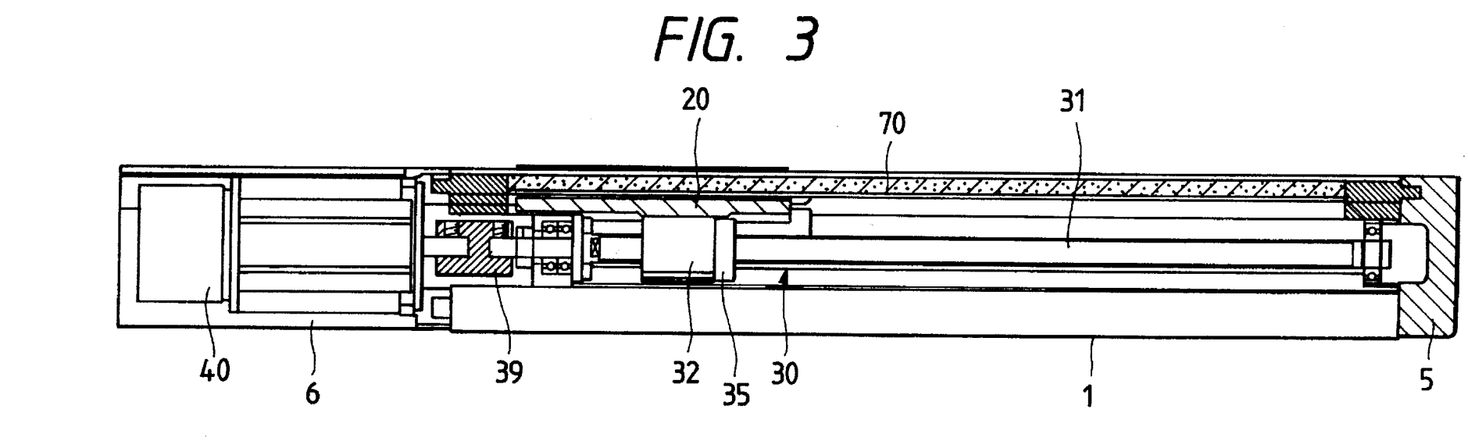
FIG. 3 is a longitudinal sectional view taken on line III—III in FIG. 1.

FIG. 1 is a cross sectional view showing a first embodiment of a linear motion actuator of the present invention;

FIG. 2 is a longitudinal sectional view taken on line II—II in FIG. 1;

FIG. 3 is a longitudinal sectional view taken on line III—III in FIG. 1; and

Figure 4:
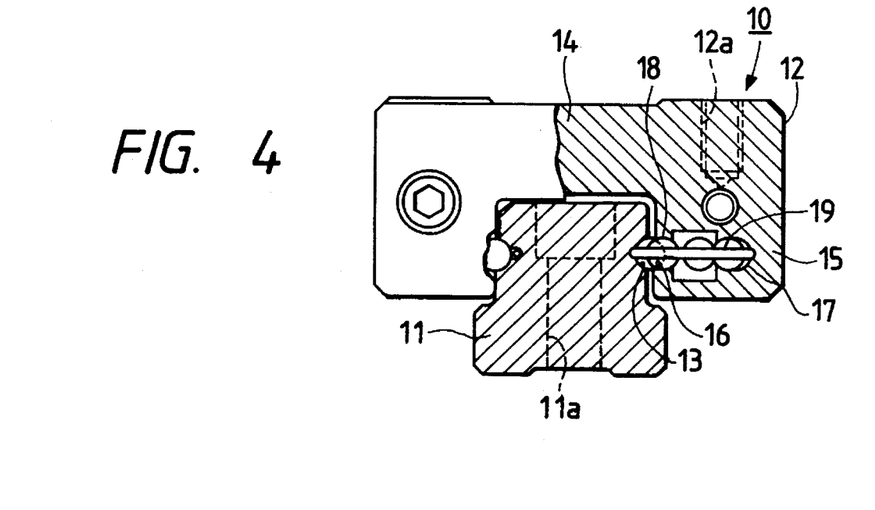
FIG. 4 is a front view, partially broken away, showing a linear guide of the linear motion actuator.

FIG. 4 is a front view, partially broken away, showing a linear guide of the linear motion actuator.

In the linear motion actuator of the first embodiment, a pair of linear guides 10 are provided within a casing 1 elongated in the axial direction of the actuator. A carriage 20 is provided so as to move freely in the axial direction along the linear guides 10.

A driving device 40 is provided which drives the carriage 20 through a ball-and-screw mechanism 30 to axially move at a specified speed to a specified position.

A pair of slits S, extending in the moving direction of the carriage 20, are formed in the top surface of the casing 1. Each carriage 20 includes a driven member mounting portion 24a protruded out of the casing 1 through the corresponding slit S.

The dust-proof structure of the linear motion actuator is described below.

Pulleys 50 are located at both ends of the casing 1 (as viewed in the axial direction), respectively. A seal band 60 has one end fastened to one end of the carriage 20. The other end of the seal band 60 is turned up at one end of the casing 1 through the pulley 50. The other end of the seal band 60 is further turned up at the other end of the casing 1 through another pulley 50, so that the other end of the seal band 60 is fastened to the other end of the carriage 20, whereby forming a movable loop of the seal band 60. The slits S are sealed by the movable loop of the seal band 60.

The construction of the linear motion actuator will be described in more detail below.

The casing 1 is made up of a casing body 2, a couple of side covers 3 and 3, an upper cover 4, an end cover 5, including a bearing, for closing one end of the casing 1, and a motor bracket 6, including a bearing, for closing the other end thereof.

In the first embodiment, the casing body 2, is extruded of aluminum. The casing body 2 has an opening of the top thereof. A satisfactory rigidity is required for the bottom of the casing body 2; otherwise it is deformed by a load, thereby deteriorating the accuracy of the transportation by the linear motion actuator. In the first embodiment, the thick part of the bottom of the casing body 2 contains a plurality of through holes that are axially extended. By providing these through holes, a satisfactory rigidity and a reduction of weight are both secured.

Elongated sunken parts 8, extending over the entire length of the casing body 2, are formed in the locations of the base of the casing body 2, which are closer to the right and left sides thereof and symmetrical with respect to the center of the actuator when viewed in cross section. Guide rails 11 of the linear guide 10, respectively, are set in the sunken parts 8 and fastened thereto by bolts (not shown). Sliders 12 are slidably mounted on the guide rails 11, respectively. In the first embodiment, a couple of sliders 12 are mounted on each rail 11.

The structure of the linear guide 10 will briefly be described below. As illustrated in an enlarged manner in FIG. 4, each of guide rails 11 is substantially square in cross section. Ball rolling grooves 13 which are, axially elongated, are formed in the upper parts of both sides of the guide rail 11.

Each of the sliders 12, shaped like an inverted U in cross section, consists of a horizontal portion 14 and leg portions 15 downward extended from both ends of the horizontal portion 14. Ball bearing grooves 16 are formed at the locations of the inner walls of the right and left leg portions 15, which respectively confront with the ball rolling grooves 13 of the guide rails 11. Circulating paths 17, communicating with the ball rolling grooves 13 and 16, are formed in the leg portions 15. A plurality of balls 18, held by a holder 19, are inserted, in a rollable manner, in the rolling paths defined by the ball bearing grooves 13 and 16, and the circulating path 17. A plurality of holes 11a for rail mounting are formed at proper intervals in each rail 11. Threaded holes 12a for receiving bolts are formed at the four corners of the upper surface of each slider 12.

The carriage 20 includes a head plate 21 and a vertical portion 22 downward extended from the bottom surface of the head plate 21. The width of the head plate 21 is slightly shorter than the width of the inside of the casing 1, and the length thereof is nearly equal to the total length of the two sliders 12 longitudinally arrayed. Both sides of the head plate 21 are placed on the upper surfaces of the right and left sliders 12 of the linear guide 10, and fastened thereto by means of bolts 27 screwed into the threaded holes 12a. In this way, the carriage 20 is axially slidably supported by the four sliders 12 within the casing 1.

An elongated sunken part 23 is formed at the central part of the upper surface of the head plate 21 of the carriage 20, while extending over the entire length of the head plate 21. Two elongated protruded portions 24, upward protruded from the head plate 21 of the carriage 20, are located on both sides of the sunken part 23. The protruded portions 24 extend over the entire length of the head plate 21 of the carriage 20. The upper surfaces of the protruded portions 24 are slightly higher than the upper cover 4, and serve as the driven member mounting portions 24a. Stepped portions 24b, stepped down from the driven member mounting portions 24a, are formed at both ends of each of the protruded portions 24 when viewed in the longitudinal direction.

The protruded portions 24 are located just above the right and left guide rails 11 of the linear guide 10. That is, the driven member mounting portions 24a of the carriage 20 are located on the axial lines of the linear guide 10 where are the best locations for securing a rigidity. With this layout of the protruded portions 24, the reduced thickness of the head plate 21 of the carriage 20 can be used.

The ball-and-screw mechanism 30 includes a ball-screw shaft 31 and a ball-screw nut 32. The ball-screw shaft 31, of which the outer surface is helically threaded, is supported at one end by the end cover 5, and at the other end by the motor bracket 6. More exactly, one end of the ball-screw shaft 31 is received by the bearing of the end cover 5, while the other end thereof is received by the bearing of the motor bracket 6. The ball-screw shaft 31 is located at the central part of the casing 1 when viewed in the width direction of the casing, while extending in parallel with the guide rails 11 of the linear guide 10. The end portion of the ball-screw shaft 31, supported by the motor bracket 6, protrudes out of the motor bracket 6 and coupled with the output shaft of driving device 40, such as a drive motor.

The ball-screw nut 32 has a helical thread on the inner surface thereof, which confront with the helical thread of the ball-screw shaft 31. The ball-screw nut 32 engage the ball-screw shaft 31 to allow a plurality of balls to roll between the confronting helical threads of them. The ball-screw nut 32 is of the end-cap circulating type in which ball circulating members (end caps) 35 are removably coupled with both ends of the nut. A ball return path as an axially extending through-hole is formed in the thick part of the nut body. A curved path, formed in the end face of the end cap 35 where is in contact with the nut body, communicates with the confronting helical threads and the return path.

With rotation of the ball-screw shaft 31 relative to the ball-screw nut 32, steel balls forwardly roll within the helical space defined by the confronting helical threads of the ball-screw shaft 31 and the ball-screw nut 32. The balls emanate the helical space, travel through the curved path of the end cap 35 and the return path of the nut body and returns to the original position.

The ball-screw nut 32 may be of the tube circulating type or the piece type, in place of the end-cap circulating type.

In the ball-screw nut 32 of the tube circulating type, a ball circulating path shaped like U is assembled into the upper portion of the nut body. The balls roll forward within the helical space defined by the confronting helical threads, and pulled into the ball circulating tube. The balls forwarded through the tube ride over the land of the ball-screw shaft 31, and return to the helical space. In this way, the balls circulate through the path endlessly.

In the ball-screw nut 32 of the piece type, a piece with a circulating groove is embedded into the thick part of the nut body. The balls are forwarded through the circulating groove of the piece, and ride over the land of the ball-screw shaft 31, and return to the helical space.

An AC servo motor as the driving device 40 is firmly mounted on the outer surface of the motor bracket 6. The output shaft of the AC servo motor 40 is coupled, through a coupling 39, with the ball-screw shaft 31 rotatably supported by the bearing within the casing 1.

The ball-screw nut 32, which engages the ball-screw shaft 31 through the balls, is embedded into and secured to the vertical portion 22 of the carriage 20, whereby the carriage 20 is coupled with the ball-and-screw mechanism 30.

When the ball-and-screw mechanism 30 is operated by the driving device 40, the carriage 20 must be moved in the axial direction in connection with the ball-screw nut 32. To this end, the slit S is formed between each side cover 3 and the upper cover 4. Thus, a couple of slits S are provided respectively in association with the couple of protruded portions 24.

The side covers 3 and the upper cover 4, which define the slits, are both extruded of aluminum. The thick end faces, confronting with each other, have guide grooves 3*a* and 4*a* as a guiding device for the seal band.

The upper cover 4 includes L-shaped extensions 4*b* and 4*b* in the central portion thereof. The extensions 4*b* extend over the entire length of the upper cover 4. The end faces of the extensions 4*b* and 4*b* confront with each other, with a space therebetween being corresponding to the width of the ball-screw nut 32. A space defined by the extension 4*b* and 4*b* and the underside of the upper cover 4 is filled with sound absorbing material 70, such as sponge.

A permanent magnet (not shown), for example, is secured to the underside of the carriage 20. An proximity switch, such as a Hall effect element, facing the permanent magnet, is mounted on the inner surface of the casing body 2. The original position of the carriage 20 in the linear motion axial direction is detected by the proximity switch and the permanent magnet. The AC servo motor 40 is controlled by the detected original position signal, thereby accurately positioning the linearly driven carriage 20.

A contact position detector (not shown), such as a limit switch, which is used for preventing an overrun of the carriage 20, may be provided at the end of the casing 1. In this case, the lead wire of the limit switch may be put in a groove 2A, formed in the outer surface of the casing body 2, so as not interfere with other members.

In the linear motion actuator thus constructed, the casing 1 has a substantially closed structure except for the slits S. These slits S are closed by the seal band 60. With this construction, the linear motion actuator is protected from dust.

The slit structures of the linear motion actuator will be described below. Since the slit structures of the right and left slits S are substantially the same, the slit structure of one of these slits will be described.

The pulleys 50 are provided at the four corners of the casing 1 (FIGS. 2 and 1). The pulley 50*a* at the upper corner of the motor bracket 6 is provided at the location on the line extended from the slit S. The pulley 50*b* at the lower corner of the motor bracket 6 is provided right under the pulley 50*a*. The pulley 50*c* at the upper corner of the end cover 5 is provided at the location on the line extended from the slit S. The pulley 50*d* at the lower corner of the end cover 5 is provided right under the pulley 50*c*.

The seal band 60 which is put on the four pulleys 50 is a flat sail cloth band containing polyurethane. One end of the seal band 60 is fastened to the stepped portion 24*b* formed at one end of the carriage 20, by means of set screws 61. The other end of the seal band 60 is fastened to the stepped portion 24*b* formed at the other end of the carriage 20, by means of set screws 61. Thus, the seal band 60 forms a loop extending from one end of the carriage 20 to the other end thereof through a route connecting pulleys 50*a*, 50*b*, 50*c*, and 50*d*.

The side edges of the seal band 60 are inserted into the guide groove 3*a* of the end face of the side cover 3 and the guide groove 4*a* of the end face of the upper cover 4, respectively. With this structure, the sealing effect by the seal band 60 is enhanced, and the seal band 60 is guided without being shifted sideways. The lower portion of the loop of the seal band 60, which ranges from the pulley 50*b* at the lower corner of the motor bracket 6 to the pulley 50*d* at the lower corner of the end cover 5, pass through a through-hole 7*a* located right under the guide rail 11, which is one of the plurality of through-holes 7 longitudinally passing through the casing body 2. A rectangular guide plate 63 is fastened to the location of the middle of the loop of the seal band 60, viz., a position right under the carriage 20 when the carriage passes the middle of the casing 1 when viewed axially. A gap is present between each side of the guide plate 63 and the corresponding inner wall of the through-hole 7*a*, whereby the seal band 60 is prevented from being shifted sideways.

After the carriage 20 is assembled to the sliders 12 of the linear guide 10, the ends of the seal band 60 are fastened to the stepped portions 24*b* of the carriage 20, whereby forming the loop of the seal band 60. Thereafter, the side covers 3 and the upper cover 4 are set to the casing body.

A workpiece (not shown) as a driven member, is firmly secured by bolts onto a pair of the driven member mounting portions 24*a* of the carriage 20, which protrude above the upper cover 4 of the casing 1.

It is assumed now that the carriage 20 stops at a position close to the motor bracket 6.

Under this condition, the AC servo motor 40 is forwardly turned. With the forward turn of the driving device 40, the ball-screw shaft 31 of the ball-and-screw mechanism 30 is forwardly turned. The rotary force of the ball-screw shaft 31 is transmitted to the ball-screw nut 32 by the balls 33, which are inserted between the helical thread 31*a* of the ball-screw shaft 31 and the helical thread 32*a* of the ball-screw nut 32. By the rotary force, the ball-screw nut 32 moves axially, so that the carriage 20 secured to the ball-screw nut 32 moves also axially.

When the ball-screw nut 32 moves, the steel balls roll forward within the ball threads, facing each other, of the ball-screw shaft 31 and the ball-screw nut 32. Since the ball-and-screw mechanism 30 is of the end-cap circulating type, the balls circulate in a manner that after reaching the nut end, the balls moves through the curved path of the end cap 35 and the return path of the nut body, and returns to the start position. If the ball-and-screw mechanism of the tube circulating type, the balls roll one or two and half turn through the helical path defined by the coupled helical threads, and then are pulled into the ball circulating tube of the nut. The balls obliquely ride over the lands of the ball-screw shaft 31 within the tube, and returns to the helical thread path. This circulation of the balls is repeated.

Thus, a number of steel balls circulate through the helical thread path and within the ball-screw nut 32, while rolling. Therefore, continuous generation of noise is inevitable in the ball-screw nut 32 of the ball-and-screw mechanism 30. The suppression of this noise will be described later.

The carriage 20 is supported at both sides by the sliders 12 of the linear guides 10. Accordingly, with the movement of the carriage 20, the sliders 12 move along the guide rails 11 of the linear guides 10. Thus, the carriage 20 is guided along the guide rails 11, with the movement of the sliders 12. In this way, the smooth movement of the carriage 20 is guaranteed, and an exact linear movement of the workpiece attached to the carriage 20 is secured.

When the sliders 12 move, a number of the steel round bodies 18 roll forward within the ball rolling grooves 13 of the guide rails 11 and the ball rolling grooves 16 of the sliders 12. The round bodies 18 are turned back by way of the curved path provided at one end of each slider 12, pass through the circulating paths 17 formed in the leg portions 15 of the sliders 12, and reach the other ends of the sliders 12. The round bodies 18 are turned back again by way of curved paths of the other ends of the sliders 12, and return to the coupled the ball rolling grooves 13 and 16.

In this way, a number of solid steel round bodies 18 circulates within the sliders 12 while rolling. Accordingly, a continuous noise is generated also in the slider 12 portions of the linear guides 10 when the linear motion actuator is operating.

The noise suppression mechanism for suppressing the continuous noise will be described below.

In the first embodiment, the sound absorbing material 70, mounted on the underside of the upper cover 4, is used for suppressing the continuous noise generated in the slider 12 portions of the linear guides 10 and the ball-screw nut 32 portion of the ball-and-screw mechanism 30. Further, noise suppression is ensured by sealing the slits S as the openings of the closed casing 1 with the seal bands 60. It is noted that the sound absorbing material 70 is disposed right above the ball-screw nut 32 where noise generation tends to occur. Because of this feature, the noise generated is effectively suppressed. A pair of extensions 4b and 4b, shaped like L, elongating over the entire length of the lower surface of the upper cover 4, are provided for supporting the sound absorbing material 70. Provision of the extensions 4b and 4b increases the rigidity of the upper cover 4.

The carriage 20 is driven by the driving device 40 through the ball-and-screw mechanism 30, and moves axially in the casing 1 while being guided by the linear guides 10. With the movement of the carriage, the protruded portions 24 of the carriage, which bear the work and are protruded from the surface of the upper cover 4, move axially within and along the slits S. As the protruded portions 24 of the carriage move, the looped seal bands 60 fastened at the ends to the protruded portions 24 are also turned. When the carriage 20 moves to the right (FIG. 2), for example, the seal bands 60 are turned back on the pulleys 50c and 50d, disposed in this order in the carriage advancing direction. The seal bands 60 are turned back again on the pulleys 50b and 50a. In this way, the seal bands 60 are turned clockwise in FIG. 2. With the turn of the seal bands 60, the guide plates 63 mounted on the lower parts of the seal bands 60 move in the direction opposite to the carriage advancing direction. The distance the guide plates 63 move is equal to the stroke length of the carriage 20. There is no fear that the guide plates 63 collide with the end cover 5 and the motor bracket 6.

It is noted that the gap present between each the guide plates 63 and the inner wall of the through-hole 7a associated therewith is very small. Therefore, the looped seal bands 60 can be effectively prevented from being shifted sideways.

Thus, the looped seal bands 60 turn in a considerably stable state with the movement of the carriage 20, while at the same time seal the slits S, which range within the moving range of the driven member mounting portions 24a of the carriage 20. The sealing is made in a manner that the side edges of each seal band 60 are inserted into the guide groove 3a of the end face of the side cover 3 and the guide groove 4a of the end face of the upper cover 4. Extremely small gaps, shaped like U in cross section, defined by the seal bands 60, the side covers 3, and the upper cover 4 connect the inside and the outside of the casing 1. The inner precise parts of the linear motion actuator is reliably protected from fine foreign matters, such as dust. Further, the seal bands 60, when turned, are not shifted sideways. Furthermore, noise generated in the linear guides 10 and the ball-and-screw mechanism 30 can be effectively confined within the casing 1.

The linear motion actuator of the first embodiment is designed for the transportation of large and heavy workpieces. To transport such a workpiece at high speed and accurately to position it, a high rigidity is required for the actuator. Particularly the carriage, which couples the work with the linear guides, directly receives the load of the workpiece. It is a very important component in determining the rigidity of the linear motion actuator. In the first embodiment, special design efforts to construct the structure to provide a high rigidity of the linear motion actuator are made.

The first feature to obtain a high rigidity of the linear motion actuator is the hollowed structure of the casing body 2 in which many through holes 7 are formed in the thick part of the bottom of the casing body 2. This hollowed structure contributes to reduce the weight of the linear motion actuator and to increase the rigidity thereof.

The second feature is that the driven member mounting portions 24a of the carriage 20, which directly receive the load of the workpiece, are located just above the guide rails 11 of the linear guides 10. With this feature, the heavy workpiece placed on the driven member mounting portions 24a is supported on the locations on the axial lines of the linear guides 10 where provide the most rigidity. The weight reduction by thinning the carriage 20 and the substantial increase of the rigidity of the linear motion actuator can both be achieved.

The third feature is that in the dust-proof structure for sealing the slits S necessary for the movement of the carriage 20, which are formed in the upper surface of the casing 1, the movable bands 60 are used by making well use of the through-hole 7a formed in the casing body 2. Specifically, the seal bands 60 are looped. One end of each looped seal band is fastened to the carriage 20. With the movement of the carriage 20, the looped seal bands 60 are circulated through the through-hole 7a. The structure of the carriage 20 is much simpler than that of the conventional one. As a result, a high rigidity of the carriage 20 is secured, and the size reduction of thereof is realized.

Figure 5:
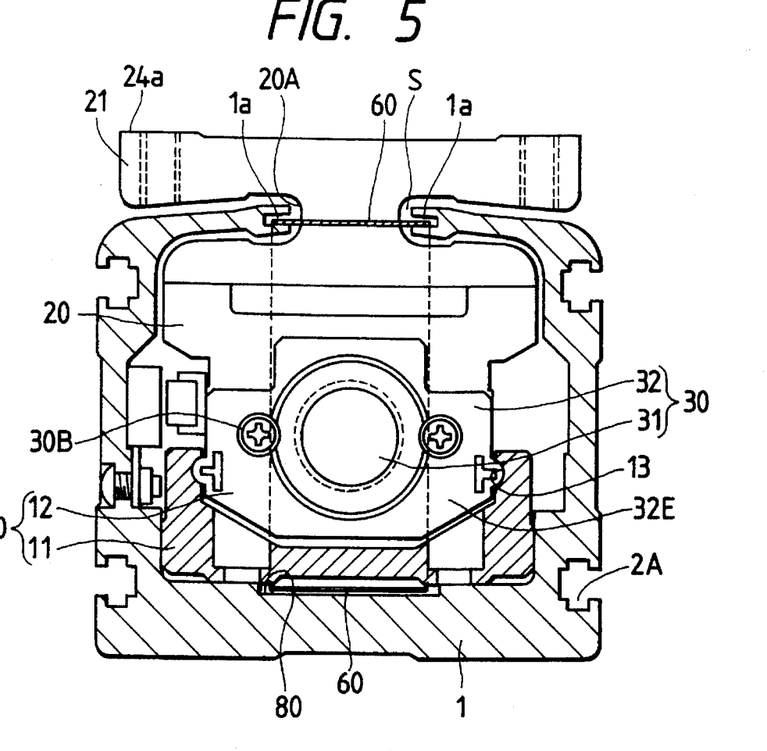
FIG. 5 is a cross sectional view showing a second embodiment.

A second embodiment of the linear motion actuator according to the present invention will be described with reference to FIG. 5. The dust-proof structure in the second embodiment is suitable for a linear motion actuator for transporting a driven member of a relatively light weight.

A casing 1, having one piece construction consisting of the bottom portion, side portions, and the upper portion, is formed by extrusion molding. A slit S, axially extended, is formed in the upper portion. A shallow sunken part 80, axially extended, is formed at the central part of the upper surface of the bottom portion. The sunken part 80 serves as a path for the seal band 60. A guide rail 11 is disposed on the surface of the bottom portion of the casing 1. The guide rail 11 is U-shaped in cross section. Ball rolling grooves 13, longitudinally extended, are formed in the inner walls, facing each other, of the guide rail 11. The ball-screw nut 32 of a ball-and-screw mechanism 30 is axially movably provided in the U-shaped guide rail 11. In this case, the ball-screw nut 32 serves also as a slider 12 of the linear guide 10.

Ball rolling grooves (not shown) are formed in both sides of the ball-screw nut 32, while confronting with the ball rolling grooves 13 of the guide rail 11. The ball-screw nut 32 is engaged with the guide rail 11 through a plurality of balls which roll along ball rolling paths formed by the ball rolling grooves opposite to each other.

Ball circulating paths as through holes extending in parallel with the respective ball rolling paths are formed in the thick parts of the right and left sides of the ball-screw nut 32. End caps 32E are fastened to the end faces of both ends of the ball-screw nut 32 when longitudinally viewed, by means of bolts 32B, respectively. A curved groove is formed in each end cap 32E. The curved grooves connect the ball rolling paths and the ball circulating paths. The ball rolling paths, the ball circulating paths, and the curved grooves cooperate to form a loop of the ball circulating path. The ball-screw nut 32 is linearly moved while being guided by the guide rail 11. At this time, a plurality of balls roll forward within the looped ball circulating path.

A ball-screw shaft 31 is screwed into the ball-screw nut 32, with the balls intervening therebetween. The ball-screw shaft 31 is rotatably supported through the bearings (not shown) by the end cover and the motor bracket, both are not shown, provided at the ends of the casing 1. The ball-screw shaft 31 is driven by a drive motor, causing the ball-screw nut 32 to linearly move in the axial direction.

The carriage 20 mounted on the ball-screw nut 32 includes a waist 20A, which is narrower than the width of the slit S of the casing 1, and a head plate 21 located outside the casing 1.

In the second embodiment, only one seal band 60 is used in the dust proof structure of the linear motion actuator. The ends of the seal band 60 are fastened to the end part of the waist 20A of the carriage 20, thereby forming a loop of the seal band.

Four pulleys are provided on both ends of the casing 1, as in the first embodiment. The seal band 60 is put on the pulleys. The looped seal band 60 is turned with the movement of the carriage 20, thereby sealing the slit S. The lower part of the band loop is placed within the sunken part 80 of the upper surface of the bottom portion of the casing 1. The guide plates 63, used in the first embodiment, are not used in this second embodiment where the casing 1 is short.

The side edges of the seal band 60 are inserted into the guide grooves 1a formed in the end faces of the upper portion of the casing 1, which define the slit S. By this construction, a reliable sealing is further secured and the seal band is not shifted sideways. A heavy workpiece placed on the driven member mounting portions 24a of the carriage 20 is supported on the locations on the axial lines of the linear guides 10 which provides the most rigidity, as in the first embodiment. Since the through hole receiving the seal band 60 is not formed in the carriage 20, the rigidity of the linear motion actuator is high.

In the second embodiment, only one set of the linear guide 10 and the ball-and-screw mechanism 30, provided within the casing 1 is used. Further, one dust-proof structure containing one seal band 60 and the pulleys for supporting the seal band is used. Further, the ball-screw nut 32 of the ball-and-screw mechanism 30 serves also as the slider. By this construction, the resultant linear motion actuator is small in size and light in weight.

In the embodiments as mentioned above, although the seal band 60 which put on the four pulleys is a flat sail cloth band containing polyurethane, steel or plastic may also be used for the seal band.

The use of a ventilation device, such as a small blower which is mounted on a suitable location, e.g., the motor bracket 6 at the end portion of the casing, may increase the inner pressure within the actuator in comparison with the pressure outside the actuator so that the air is blown into the actuator. In this case, the dust proofing effect is further enhanced. When the ventilation device sucks air from the inside of the actuator, a negative pressure is created within the actuator. In this case, generation of dust such as metal particles, lubricant particles, and the like can be suppressed within the actuator. These measures can be realized with a reduced amount of air flow since the opening area of the casing is very small.

The ball-screw nut 32 used in the above-mentioned embodiments is square in shape, but may be tubular.

As seen from the foregoing description, the linear motion actuator of the present invention is provided with the casing having the slits extending axially, the carriage being axially movable along the guide rails within the casing, the carriage including the driven member mounting portions protruded outside through the slits for mounting the driven member, the seal bands fastened to the driven member mounting portions of the carriage for sealing the opening of the slit regardless of the location of the carriage when the seal band is moved along the slit, and the driving device for driving the carriage to move along the guide rails.

In this linear motion actuator, the seal band is looped in a state that the ends of the seal band are respectively located at the front and rear sides of the driven member mounting portion when viewed in the axial direction.

Further, in the linear motion actuator, the side edges of the seal band are respectively inserted into the axially elongated grooves formed in the end faces of the portions defining the slit, whereby the seal band is smoothly movable in the axial direction but is not shifted in the direction opposite to the axial direction.

The seal band is passed through the axially elongated through hole formed in the casing, and the seal band is guided through the through hole by the guide plate fastened thereto, the guide plate being axially movable.

The driving device includes the ball-screw shaft axially oriented and the ball-screw nut screwed into the ball-screw shaft. The sound absorbing material is disposed in the axially extending sunken part formed in the location of the casing closer to the ball-screw shaft.

With such a construction, there is no need of passing the seal band through the carriage. Accordingly, the carriage may have a solid and simple structure of high rigidity. The size reduction of the linear motion actuator is easy, free from the abnormal shifting motion of the seal band. Accordingly, the linear motion actuator with a dust-proof function, provided by the invention, is small in size, light in weight, and high in rigidity.

What is claimed is:

1. A linear motion actuator comprising:

a casing including a slit extending in an axial direction;

a carriage being axially movable along a guide rail in said casing, said carriage including a driven member mounting portion protruded outside through said slit for mounting a driven member;

a seal band fastened to said driven member mounting portion of said carriage so as to move corresponding to a movement of said carriage for sealing an opening of said slit regardless of a location of said carriage when said seal band is moved by said carriage along said slit; and a driving means for driving said carriage to move along said guide rail, wherein said seal band is looped by fastening both ends thereof respectively at front and rear sides of said driven member mounting portion in the axial direction.

2. A linear motion actuator comprising:

a casing including a slit extending in an axial direction;

a carriage being axially movable along a guide rail in said casing, said carriage including a driven member mounting portion protruded outside through said slit for mounting a driven member;

a seal band fastened to said driven member mounting portion of said carriage so as to move corresponding to a movement of said carriage for sealing an opening of said slit regardless of a location of said carriage when said seal band is moved by said carriage along said slit; and a driving means for driving said carriage to move along said guide rail, wherein side edges of said seal band are respectively inserted into grooves elongated axially in end faces of said silt facing axial sides of said driven member mounting portion so that said seal band is smoothly movable in the axial direction but is not shifted in the direction opposite to the axial direction.

3. A linear motion actuator comprising:

a casing including a slit extending in an axial direction;

a carriage being axially movable along a guide rail in said casing, said carriage including a driven member mounting portion protruded outside through said slit for mounting a driven member;

a seal band fastened to said driven member mounting portion of said carriage so as to move corresponding to a movement of said carriage for sealing an opening of said slit regardless of a location of said carriage when said seal band is moved by said carriage along said slit;

a driving means for driving said carriage to move along said guide rail; and a guide plate fastened to said seal band under said guide rail in said casing, wherein said seal band is passed through an axially elongated through hole formed under said guide rail in said casing, and said seal band is guided by said guide plate so as to be axially movable through said through hole.

4. A linear motion actuator, comprising:

a casing including a slit extending in an axial direction;

a carriage being axially movable along a guide rail in said casing, said carriage including a driven member mounting portion protruded outside through said slit for mounting a driven member;

a seal band fastened to said driven member mounting portion of said carriage so as to move corresponding to a movement of said carriage for sealing an opening of said slit regardless of a location of said carriage when said seal band is moved by said carriage along said slit;

a driving means for driving said carriage to move along said guide rail;

wherein said driving means includes a ball-screw shaft oriented in the axial direction within said casing, a ball-screw nut screwed into said ball-screw shaft, and a sound absorbing material disposed in an axially extending sunken part formed in a location of said casing closer to said ball-screw shaft.

5. A linear motion actuator comprising:

a casing including a slit extending in an axial direction;

a guide rail mounted in the casing;

a carriage being axially movable along the guide rail in parallel with the guide rail in said casing, said carriage including a driven member mounting portion that protrudes outside through said slit for mounting a driven member;

a band seal fastened to said driven member mounting portion of said carriage so as to move corresponding to a movement of said carriage for sealing an opening of said slit regardless of a location of said carriage when said seal band is moved by said carriage along said slit, wherein said seal band is looped by fastening both ends thereof respectively to front and rear sides of said driven member mounting portion in the axial direction; and a driving means for driving said carriage to move along said guide rail.

6. A linear motion actuator comprising:

a casing including a slit extending in an axial direction;

a guide rail mounted in the casing;

a carriage being axially movable along the guide rail in parallel with the guide rail in said casing, said carriage including a driven member mounting portion that protrudes outside through said slit for mounting a driven member;

a seal band fastened to said driven member mounting portion of said carriage so as to move corresponding to a movement of said carriage for sealing an opening of said slit regardless of a location of said carriage when said seal band is moved by said carriage along said slit, wherein the edges of said seal band are respectively inserted into elongated axially grooves formed in end faces of said slit facing axial sides of said driven member mounting portion so that said seal band is smoothly movable in the axial direction but is not shifted in the direction opposite to the axial direction; and a driving means for driving said carriage to move along said guide rail.

7. A linear motion actuator comprising:

a casing including a slit extending in an axial direction;

a guide rail mounted in the casing;

a carriage being axially movable along the guide rail in parallel with the guide rail in said casing, said carriage including a driven member mounting portion that protrudes outside through said slit for mounting a driven member;

a seal band fastened to said driven member mounting portion of said carriage so as to move corresponding to a movement of said carriage for sealing an opening of said slit regardless of a location of said carriage when said seal band is moved by said carriage along said slit;

a guide plate fastened to said seal band under said guide rail in said casing, wherein said seal band is passed through an axially elongated through hole formed under said guide rail in said casing, and said seal band is guided by said guide plate to be axially movable through said through hole; and a driving means for driving said carriage to move along said guide rail.

8. A linear motion actuator comprising:

a casing including a slit extending in an axial direction;

a guide rail mounted in the casing;

a carriage being axially movable along the guide rail in parallel with the guide rail in said casing, said carriage including a driven member mounting portion that protrudes outside through said slit for mounting a driven member;

a seal band fastened to said driven member mounting portion of said carriage so as to move corresponding to a movement of said carriage for sealing an opening of said slit regardless of a location of said carriage when said seal band is moved by said carriage along said slit; and a driving means for driving said carriage to move along said guide rail, said driving means includes a ball-screw shaft extending in the axial direction within said casing, a ball-screw nut screwed into said ball-screw shaft, and a sound absorbing material disposed in an axially extending sunken part formed in a location of said casing closer to said ball-screw shaft.

9. A linear motion actuator as recited in claim 1, wherein the carriage moves along the guide rail in parallel with the guide rail.

10. A linear motion actuator as recited in claim 2, wherein the carriage moves along the guide rail in parallel with the guide rail.

11. A linear motion actuator as recited in claim 3, wherein the carriage moves along the guide rail in parallel with the guide rail.

12. A linear motion actuator as recited in claim 4, wherein the carriage moves along the guide rail in parallel with the guide rail.

* * * * *